July 14, 1942.　　W. F. BERNSTEIN　　2,289,620
METAL SPRAYED GASKET
Filed March 12, 1941
Fig.1
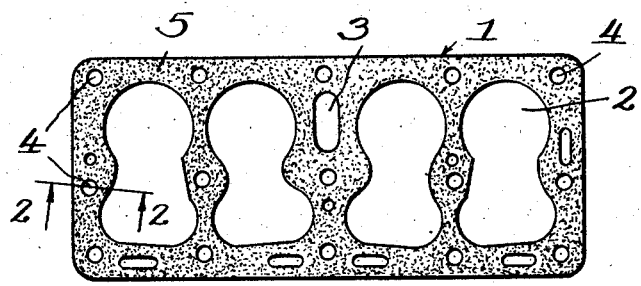
Fig.2
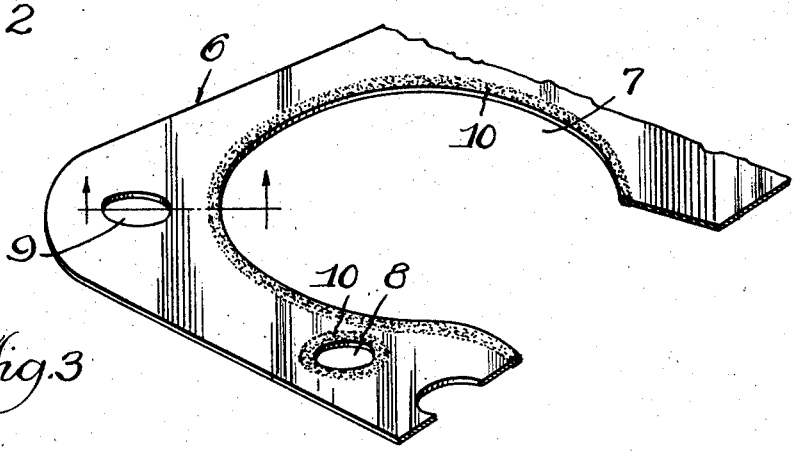
Fig.3
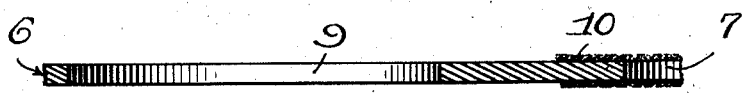
Fig.4
Witness:
Chas. R. Kunsh.
INVENTOR.
Wilburn F. Bernstein,
BY Parkinson & Lane
Attys.

Patented July 14, 1942

2,289,620

UNITED STATES PATENT OFFICE 2,289,620

METAL SPRAYED GASKET

Wilburn F. Bernstein, Brookfield, Ill., assignor to Victor Manufacturing & Gasket Company, Chicago, Ill., a corporation of Illinois Application March 12, 1941, Serial No. 382,862

2 Claims. (Cl. 288—28)

The present invention relates to a gasket construction and more particularly to a gasket consisting of a sheet of metal blanked to conform to the combustion openings, water holes and bolt holes of a cylinder head and block of an internal combustion engine. This gasket is then sprayed either in its entirety or around the combustion openings and water holes with a metallic spray gun using metal such as aluminum, lead, tin, brass, bronze, stainless steel, Monel or other metal suitable for the purpose. This results in the formation of a porous surface structure to which may then be applied a suitable coating of a resinous substance which anchors itself into the porous structure of the sprayed metal and makes for a more efficient seal on the motor.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while I have shown therein a preferred embodiment, it is to be understood that the same is susceptible of modification and change, and comprehends other details, arrangements of parts, features and constructions without departing from the spirit of the invention.

In the drawing:

Figure 1 is a plan view of one form of cylinder head gasket of the novel invention.

Figure 2 is a view in vertical cross section taken in a plane represented by the line 2—2 of Figure 1.

Figure 3 is a fragmentary enlarged view in perspective of another form of the invention in which the metal is sprayed merely around the combustion openings and water holes.

Figure 4 is a fragmentary view in vertical cross section taken in a plane represented by the line 4—4 of Figure 3.

Referring more particularly to the disclosure in Figures 1 and 2 of the drawing, the novel invention is shown in a cylinder head gasket 1 formed of a sheet of metal such as steel of desired thickness and having the usual combustion openings 2, water holes 3 and bolt holes 4, the metal being sprayed onto the surface of the gasket as shown at 5. Any metal suitable for the purpose, such as aluminum, lead, tin, brass, bronze, stainless steel, Monel, or the like, may be applied by a metallic spray gun. The deposit of metal forms a porous surface structure to which may then be applied by roll coating or the like a heat convertible synthetic resin of the alkyd type, of the modified alkyd type, or of the phenol-formaldehyde type. This resinous coating will anchor itself onto the porous structure of the sprayed metal and make for an excellent seal adapted for use especially on a cylinder head gasket, although it may be applied to seal other parts.

In Figures 3 and 4 is disclosed an alternate construction in which any desired form of gasket 6, provided with the usual combustion openings 7, water holes 8 and bolt holes 9, is sprayed around the combustion openings and water holes with the metallic substance or particles as shown at 10. This provides an elevation of the area adjacent the combustion openings and water holes and provides for a most effective seal adjacent these openings. The gasket so sprayed may then be coated with any of the resin solutions suggested above.

In this form of the invention the spraying may be accomplished by the use of a template which covers the gasket surface except for exposing a desired area around the combustion openings and water holes.

From the above description and disclosure in the application it will be apparent that the invention comprehends a novel construction of gasket which is relatively inexpensive but which provides for a most effective sealing medium.

I claim:

1. A cylinder head gasket comprising a sheet of metal blanked to conform to the combustion openings, water holes and bolt holes of a cylinder head and block, metal particles deposited on and intimately joined to the face of said gasket about the combustion openings and water holes to provide a porous roughened surface, and a coating of a heat convertible synthetic resin covering and anchored in the porous surface of the metal particles to seal the space between the cylinder head and block of a combustion engine against the high temperatures and pressure to which a cylinder head gasket is subjected.

2. A cylinder head gasket consisting of a sheet of metal blanked to conform to the combustion openings, water holes and bolt holes of a cylinder head and block, metal particles deposited on and intimately joined to the face of said gasket in metal-to-metal contact about the combustion openings to provide a porous roughened surface, and a heat convertible resinous coating anchored in the roughened and porous surface of the deposited metal particles.

WILBURN F. BERNSTEIN.